United States Patent
Khalefa et al.

(10) Patent No.: US 9,135,565 B1
(45) Date of Patent: Sep. 15, 2015

(54) MULTIPLE REFERENCE POINT SHORTEST PATH ALGORITHM

(75) Inventors: Mohamed Elbassiony Mohamed Abou El Alaa Khalefa, Alexandria (EG); Matthew H. Austern, Palo Alto, CA (US); James C. Dehnert, Palo Alto, CA (US); Aart J. C. Bik, Union City, CA (US); Grzegorz Czajkowski, Redwood City, CA (US); Grzegorz Malewicz, Tokyo (JP)

(73) Assignee: Google Inc., Mountain View, CA (US)

( * ) Notice: Subject to any disclaimer, the term of this patent is extended or adjusted under 35 U.S.C. 154(b) by 557 days.

(21) Appl. No.: 13/451,894

(22) Filed: Apr. 20, 2012

Related U.S. Application Data (60) Provisional application No. 61/477,559, filed on Apr. 20, 2011, provisional application No. 61/483,183, filed on May 6, 2011.

(51) Int. Cl.
*G06F 15/17* (2006.01)
*G06N 99/00* (2010.01)
*G06F 15/173* (2006.01)

(52) U.S. Cl.
CPC .......... *G06N 99/00* (2013.01); *G06F 15/17312* (2013.01)

(58) Field of Classification Search
CPC ............ G04L 12/243; G06F 15/17312; H04L 12/5689
USPC .......................................................... 706/62
See application file for complete search history.

(56) References Cited

U.S. PATENT DOCUMENTS

| | | | |
|---|---|---|---|
| 5,734,833 | A | 3/1998 | Chiu et al. |
| 7,392,258 | B2 | 6/2008 | Bogner et al. |
| 8,429,110 | B2 | 4/2013 | Cai et al. |
| 8,458,229 | B2 | 6/2013 | Oliver et al. |
| 2002/0067720 | A1* | 6/2002 | Garcia-Luna-Aceves et al. ............................. 370/389 |
| 2006/0212860 | A1 | 9/2006 | Benedikt et al. |
| 2006/0268879 | A1* | 11/2006 | Xhafa et al. .................. 370/392 |
| 2008/0216077 | A1 | 9/2008 | Emani et al. |
| 2008/0271022 | A1 | 10/2008 | Strassner et al. |
| 2009/0055343 | A1 | 2/2009 | Van Lunteren |
| 2010/0017537 | A1 | 1/2010 | Linnartz et al. |

(Continued)

OTHER PUBLICATIONS

Kang, F., et al., "Correlated Label Propagation with Application to Multi-label Learning," Proceedings of the 2006 IEEE Computer Society Conference on Computer Vision and Pattern Recognition (CVPR'06), 2006, pp. 1719-1726.

(Continued)

*Primary Examiner* — Kakali Chaki
*Assistant Examiner* — Vincent Gonzales
(74) *Attorney, Agent, or Firm* — Fish & Richardson P.C.

(57) ABSTRACT

Data are maintained in a distributed computing system that describe a directed graph representing relationships among items. The directed graph has a plurality of vertices representing the items and has edges with values representing distances between the items connected by the vertices. A multiple reference point algorithm is executed for a plurality of the vertices in the directed graph in parallel for a series of synchronized iterations to determine shortest distances between the vertices and the source vertex. After executing the algorithm on the vertices, value pairs associated with the vertices are aggregated. The aggregated value pairs indicate shortest distances from the respective vertices to the source vertex. The aggregated value pairs are outputted.

18 Claims, 8 Drawing Sheets

(56) References Cited

U.S. PATENT DOCUMENTS

2011/0307436 A1    12/2011    Cai et al.
2011/0314075 A1    12/2011    Boldyrev et al.

OTHER PUBLICATIONS

Rao, D., et al., "Ranking and Semi-supervised Classification on Large Scale Graphs Using Map-Reduce," Proceedings of the 2009 Workshop on Graph-based Methods of Natural Language Processing, ACL-IJCNLP 2009, pp. 58-65.

Anderson, T., et al., "High-Speed Switch Scheduling for Local-Area Networks," *ACM Trans. Comp. Syst.* 11(4): 319-352, 1993.

Bader, D., et al., "Designing Multithreaded Algorithms for Breadth-First Search and *st*-connectivity on the Cray MTA-2," in *Proc. 35th Intl. Conf. on Parallel Processing* (ICPP'06), Columbus, Ohio, Aug. 2006, pp. 523-530.

Barroso, L., et al., "Web search for a planet: The Google Cluster Architecture," *IEEE Micro* 23(2):22-28, 2003.

Bayati, M., et al., "Maximum Weight Matching via Max-Product Belief Propagation," in *Proc. IEEE Intl. Symp. on Information Theory*, pp. 1763-1767, 2005.

Bellman, R., "On a routing problem," *Quarterly of Applied Mathematics* 16(1):87-90, 1958.

Bonorden, O., et al., "The Paderborn University BSP (PUB) library," *Parallel Computing* 29:187-207, 2003.

Brin, S., et al., "The Anatomy of a Large-Scale Hypertextual Web Search Engine," in *Proc. 7th Intl. Conf on the World Wide Web*, pp. 107-117, 1998.

Chan, A., et al., "CGMGRAPH/CGMLIB: Implementing and Testing CGM Graph Algorithms on PC Clusters and Shared Memory Machines," *Intl. J. of High Performance Computing Applications* 19(1):81-97, 2005.

Chang, F., et al., "Bigtable: A Distributed Storage System for Structured Data," *ACM Trans. Comp. Syst.* 26(2) Article 4, 26 pages, 2008.

Cherkassky, B., et al., "Shortest paths algorithms: Theory and experimental evaluation," *Mathematical Programming* 73:129-174, 1996.

Cohen, J., "Graph Twiddling in a MapReduce World," *Comp. in Science & Engineering*, pp. 29-41, Jul./Aug. 2009.

Crobak, J., et al., "Advanced Shortest Paths Algorithms on a Massively-Multithreaded Architecture," in *Proc. First Workshop on Multithreaded Architectures and Applications*, pp. 1-8, 2007.

Czajkowski, G., "Large-scale graph computing at Google," Google Research Admin., Jun. 2009, 1 page, [online][retrieved Jul. 20, 2012] retrieved from the internet <<http://googleresearch.blogspot.com/2009/06/large-scale-graph-computing-at-google.html>.

Daly, J., "A higher order estimate of the optimum checkpoint interval for restart dumps," *Future Generation Computer Systems* 22:303-312, 2006.

Dean, J., et al., "MapReduce: Simplified Data Processing on Large Clusters," in *Proc. 6th USENIX Symp. on Operating Syst. Design and Impl.*, pp. 137-150, 2004.

Dijkstra, E., et al., "A Note on Two Problems in Connexion with Graphs," *Numerische Mathematik* 1:269-271, 1959.

Erwig, M., "Inductive graphs and functional graph algorithms," *J. Functional Programming* 11(5):467-492, Sep. 2001.

Ghemawat, S., et al., "The Google File System," in *Proc. 19th ACM Symp. on Operating Syst. Principles*, pp. 29-43, 2003.

Google Project Hosting, "Protobuf: Protocol Buffers—Google's data interchange format," 2 pages, [online] [retrieved Jul. 20, 2012] retrieved from the internet <http://code.google.com/p/protobuf/ 2009>.

Goudreau, M., et al., "Portable and Efficient Parallel Computing Using the BSP Model," *IEEE Transactions on Computers* 48(7): 670-689, 1999.

Gregor, D., et al., "Lifting Sequential Graph Algorithms for Distributed-Memory Parallel Computation," in *Proc. of Parallel Object-Oriented Scientific Computing* (POOSC), 15 pages, Jul. 2005.

Gregor, D., et al., "The Parallel BGL: A Generic Library for Distributed Graph Computations," in *Proc. 2005 ACM SIGPLAN Conf. on Object-Oriented Prog., Syst., Lang., and Applications* (OOPSLA'05), pp. 423-437, Oct. 2005.

Hagberg, A., et al., "Exploring Network Structure, Dynamics, and Function using NetworkX," in *Proc. 7th Python in Science Conf.*, pp. 11-15, 2008.

Hill, J., et al., "BSPlib: The BSP programming library," *Parallel Computing* 24:1947-1980, 1998.

Isard, M., et al., "Dryad: Distributed Data-Parallel Programs from Sequential Building Blocks," in *Proc. European Conf. on Computer Syst.*, pp. 59-72, 2007.

Kang, U., et al., "PEGASUS: A Peta-Scale Graph Mining System—Implementation and Observations," in *Proc. Intl. Conf. Data Mining*, pp. 229-238, 2009.

Lumsdaine, A., et al., "Challenges in Parallel Graph Processing," *Parallel Processing Letters* 17:5-20, 2007.

Madduri, K., et al., "A Faster Parallel Algorithm and Efficient Multithreaded Implementations for Evaluation Betweenness Centrality on Massive Datasets," in *Proc. 3rd Workshop on Multithreaded Architectures and Applications* (MTAAP'09), Rome, Italy, May 2009, 8 pages.

Madduri, K., et al., "Parallel Shortest Path Algorithms for Solving Large-Scale Instances," *DIMACS Implementation Challenge—The Shortest Path Problem*, 39 pages, 2006.

Malewicz, G., "A Work-Optimal Deterministic Algorithm for the Certified Write-All Problem with a Nontrivial Number of Asynchronous Processors," *SIAM J. Comput.* 34(4):993-1024, 2005.

Malewicz, G., et al., "Pregel: A System for Large-Scale Graph Processing," in *Comm. ACM SIGMOD/POD*, Indianapolis, Indiana, Jun. 6-10, 2010, 11 pages.

Meyer, U., et al., "Design and Implementation of a Practical I/O-efficient Shortest Paths Algorithm," in *Proc. 3rd Workshop on Multithreaded Architectures and Applications* (MTAAP'09), Rome, Italy, May 2009, 12 pages.

Meyer, U., et al., "Δ-stepping: a parallelizable shortest path algorithm," *Journal of Algorithms* 49:114-152, 2003.

Munagala, K., et al., "I/O-Complexity of Graph Algorithms," in *Proc. 10th Annual ACM-SIAM Symp. on Discrete Algorithms*, pp. 687-694, 1999.

Olston, C., et al., "Pig Latin: A Not-So-Foreign Language for Data Processing," in *Proc. ACM SIGMOD Intl. Conf. on Management of Data*, pp. 1099-1110, 2008.

Pike, R., et al., "Interpreting the data: Parallel analysis with Sawzall," *Scientific Programming* 13(4):277-298, 2005.

Thorup, M., "Undirected Single-Source Shortest Paths with Positive Integer Weights in Linear Time," *J. ACM* 46(3):362-394, May 1999.

Valiant, L., "A Bridging Model for Parallel Computation," *Comm. ACM* 33(8):103-111, 1990.

Wikipedia, "Bulk synchronous parallel," 3 pages, [online] [retrieved on Mar. 10, 2010] retrieved from the internet <http://en.wikipedia.org/w/index.php?title=Bulk_synchronous_parallel &oldid=349030784>.

Wikipedia, "Distributed computing," 8 pages, [online] [retrieved Mar. 23, 2010] retrieved from the internet <http://en.wikipedia.org/w/index.php?title=Distributed_computing&oldid=351626983>.

Yoo, A., et al., "A Scalable Distributed Parallel Breadth-First Search Algorithm on BlueGene/L," in *Proc. 2005 ACM/IEEE Conf. on Supercomputing* (SC'05), pp. 25-43, 2005.

Yu, Y., et al., "DryadLINQ: A System for General Purpose Distributed Data-Parallel Computing Using a High-Level Language," in *Proc. 8th USENIX Symp. on Operating Syst. Design and Implementation*, pp. 10-14, 2008.

Ziv, A., et al., "An On-Line Algorithm for Checkpoint Placement," *IEEE Transactions on Computers* 46(9):976-985, Sep. 1997.

\* cited by examiner

MULTIPLE REFERENCE POINT SHORTEST PATH ALGORITHM

CROSS-REFERENCE TO RELATED APPLICATIONS

This application claims the benefit of U.S. Provisional Application No. 61/477,559, filed Apr. 20, 2011, and U.S. Provisional Application No. 61/483,183, filed May 6, 2011, each of which is hereby incorporated herein by reference.

BACKGROUND

1. Technical Field

This disclosure pertains in general to distributed computing and in particular to using a distributed computing system to find a path between nodes of a graph.

2. Background Information

In graph processing, a computing problem is represented by a graph having a set of vertices connected by a set of edges. The edges may have associated weights indicating, e.g., a distance represented by the edge or a cost incurred by traversing the edge. The graph can be used, for example, to model a real-world condition, and then the graph processing can act on the graph to analyze the modeled condition. For example, the World Wide Web can be represented as a graph where web pages are vertices and links among the pages are edges. In this example, graph processing can analyze the graph to provide information to a search engine process that ranks search results. Similarly, a social network can be represented as a graph and graph processing can analyze the graph to learn about the relationships in the social network. Graphs can also be used to model transportation routes, paths of disease outbreaks, citation relationships among published works, and similarities among different documents.

The single source shortest path problem is the problem of finding the shortest path between a single source vertex and every other vertex in a graph. For example, if a graph represents a road network a single source shortest path algorithm may seek to determine the shortest paths between a city and every other city in the graph. Conventional single source shortest path algorithms are implemented on a single system, use a single reference point, visit each vertex, and can only send messages between neighboring vertices. Conventional single source shortest path algorithms are slow in finding the shortest path in large graphs because they require traveling the diameter of the graphs.

For complex graphs, determining the shortest paths between vertices is a difficult problem and requires significant computing resources.

SUMMARY

The above and other needs are met by a method, a non-transitory computer-readable storage medium and a system for a multiple reference point shortest path algorithm. The embodiments described herein uses parallelism provided by a distributed computing environment and multiple reference points to find the shortest path between a source vertex and every other vertex in a graph. In particular, the vertices in the graph maintain their distances to a source vertex and multiple reference vertices and the vertices perform a set of operations in parallel in a series of synchronized iterations. The operations at a respective vertex during an iteration include receiving update messages from other vertices containing updated distances, updating its own distances to the source vertex and the reference vertices based on the distances in the received update messages, and sending update messages to other vertices containing new distances. When a non-reference vertex discovers an updated distance to the source vertex or to a reference vertex, the non-reference vertex sends an update message to its neighboring vertices, which are vertices connected to the non-reference vertex by an outgoing edge. When a reference vertex discovers an updated path to the source vertex, the reference vertex sends a global message containing the updated distance directly to each vertex in the graph. This way, a respective vertex receives an updated distance to the source vertex without having to wait for the updated distance to be relayed through various paths of vertices between the respective vertex and the reference vertex, which may be long. As a result, fewer iterations and processing time is required to determine the shortest paths to the source vertex. For large graphs, the amount of processing time saved would be significant.

Embodiments of the method comprise maintaining data in a distributed computing system. The data describe a directed graph that represents relationships among items. The directed graph has a plurality of vertices representing the items and edges with values representing distances between the items. The method includes executing a multiple reference point algorithm for the plurality of the vertices in the directed graph in parallel for a series of synchronized iterations to determine shortest distances between the plurality of vertices and a source vertex. The operations of the multiple reference point algorithm for a respective vertex of the plurality of vertices during an iteration include receiving an update message indicating a distance between the respective vertex and a designated vertex of a set of designated vertices, where the set of designated vertices comprises the source vertex and at least one reference vertex. The operations of the multiple reference point algorithm for a respective vertex during an iteration further include updating a value pair associated with the respective vertex and indicating a distance from the respective vertex to the designated vertex. The updating occurs based on a comparison of the distance indicated in the update message and the distance indicated by the value pair associated with the respective vertex. The operations of the multiple reference point algorithm for a respective vertex during an iteration further include determining a new value pair based on the updated value pair and sending a message including the new value pair to one or more other vertices in the directed graph. The method further includes aggregating value pairs associated with the plurality of vertices of the directed graph. The aggregated value pairs indicate shortest distances from the plurality of vertices to the source vertex. The method further includes outputting the aggregated value pairs.

Embodiments of the non-transitory computer-readable storage medium store executable computer program instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will recognize from the following description that alternative embodiments of the structures and methods illustrated herein may be employed without departing from the principles of the disclosure described herein.

DETAILED DESCRIPTION

Figure 1:
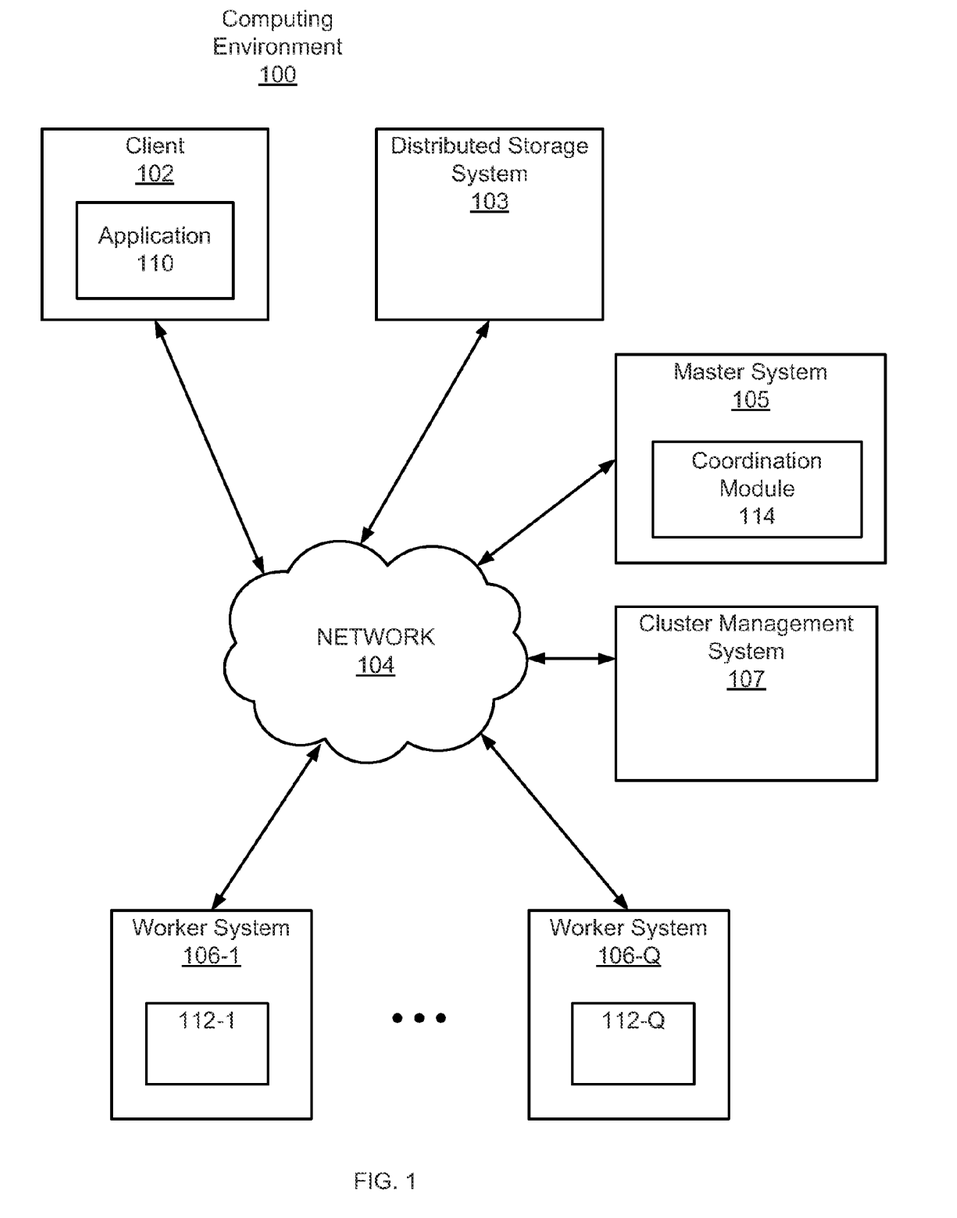
FIG. 1 is a high-level block diagram of a computing environment, according to one embodiment.

FIG. 1 is a high-level block diagram of a distributed computing environment 100 for performing a multiple reference point shortest path algorithm on a graph modeling real-world conditions. FIG. 1 illustrates a client 102, a master system 105, distributed storage system 103, cluster management system 107, and worker systems 106 connected by a network 104. Collectively, the distributed computing environment 100 is used to define a graph modeling real-world conditions as a set of relationships among a tangible set of items, such as documents and links on the Internet, a computer network topology, transportation routes in a geographic map, or a social graph. In addition, the computing environment 100 is used to analyze the modeled conditions in order to solve one or more real-world problems associated with the conditions. In some embodiments, the one or more real-world problems may be solved by determining a shortest distance between a source vertex and the other vertices in the graph. This analysis may apply one or more algorithms to the graph, including an algorithm for determining the shortest paths between vertices within the graph, or may apply an algorithm one or more times.

In an embodiment described herein, the distributed computing environment applies a multiple reference point shortest path algorithm to the graph. The multiple reference point shortest path algorithm uses parallelism provided by the distributed computing environment to efficiently find the shortest paths from a source vertex to the other vertices in the graph. The distributed computing system, and algorithm, thus enable identification of solutions to the real-world problems associated with the conditions modeled by the graph in a more efficient manner than would otherwise be possible.

At a high-level, the client 102 is used to provide the location of graph data describing the graph and to specify one or more algorithms to be performed on the graph data. Assume for purposes of this discussion that the algorithms include the multiple reference point shortest path algorithm. The graph itself is represented as a set of vertices connected by a set of directed edges. The graph data describing the graph is stored on the distributed storage system 103. The master system 105 or the cluster management system 107 provide the one or more algorithms to the worker systems 106 and assigns partitions of the graph data to the worker systems 106. In some embodiments, the worker systems 106 may retrieve and store copies of their assigned graph partitions. The worker systems 106 perform the multiple reference point shortest path algorithm on the partitions of the graph data within their respective ambits.

In more detail, the client 102 specifies a directed graph in which each vertex is uniquely identified by a string vertex identifier. For example, the client 102 may provide information identifying the location of the directed graph on the distributed storage system 103. Each vertex is also associated with a modifiable, user-defined value. The directed edges are associated with their source vertices, and each edge has a modifiable, user-defined value and a target vertex identifier. Vertices communicate directly with one another by sending messages, each of which includes a message value and the name of the destination vertex.

The edge values indicate the costs of traveling along the directed edge from the first vertex to the second vertex joined by the edge. In one embodiment, the cost of an edge represents the distance between the entities represented by the joined vertices. Hence, a least-cost path from one vertex to another is referred to herein as the "shortest" path. It will be understood that "shortest," in this context, may represent measurements other than distance. The shortest path thus may be, for example, the fastest, least expensive, or otherwise most desirable path.

An exemplary computation includes initialization of a graph and execution of the algorithm of the user program on multiple systems. The algorithm performs a sequence of iterations or supersteps separated by global synchronization points until the algorithm terminates and produces an output. Within each superstep, the vertices compute in parallel, each executing a defined function that expresses the logic of the algorithm. A vertex can modify its state or that of its outgoing edges, receive messages sent to it in the previous superstep, send messages to other vertices (to be received in the next superstep), or even mutate the topology of the graph.

The algorithm terminates when every vertex votes to halt. In superstep 0 (the initial superstep), every vertex is in the active state; all active vertices participate in the computation of any given superstep. A vertex deactivates itself by voting to halt. Halting means that the vertex has no further work to do unless triggered externally, and that vertex will not execute in subsequent supersteps unless it receives a message. If reactivated by a message, a vertex must explicitly deactivate itself again. The algorithm as a whole terminates when all vertices are simultaneously inactive and there are no messages in transit.

The output of the algorithm is a set of values explicitly output by the vertices. The output represents a solution to the real-world problem associated with the modeled conditions involving the set of relationships among the set of items. Thus, for a solution seeking to find the shortest path between two items, the output of the algorithm is a path through the graph from the vertex representing the first item to the vertex representing the second item. The path, for example, may represent a transportation route, computer network route, or the time it takes to travel between geographic locations. In some embodiments, the output of the multiple reference point algorithm is a set of shortest paths between a source vertex and all vertices of the graph.

Turning now to the specific entities illustrated in FIG. 1, the client 102 is a computing device with a processor and a memory that includes an application 110 for providing the master system 105 and/or the cluster management system 107 with a user program and the location of the graph data. The user program defines the multiple reference point shortest path algorithm. The application 110 sends a copy of the user program to the master system 105 and/or the cluster management system 107. The application 110 also sends graph data or a location of the graph data to the master system 105.

The distributed storage system 103 includes one or more systems that stores the graph data. The distributed storage system 103 may provide the graph data to the systems connected to network 104 (i.e., client 102, master system 105, cluster management system 107, and/or worker system 106). In some embodiments, the graph data is stored as a plurality of graph partitions, where a graph partition stores data describes a subset of the edges and vertices of a directed graph. In one embodiment, the distributed storage system 103 stores a file for each graph partition. The distributed storage system 103 stores the solution to the multiple reference point algorithm which is output by the vertices of the graph. In some embodiments, the distributed system 103 stores a file per each graph partition containing the output from the vertices of the partition.

The cluster management system 107 is a computing device with a processor and a memory. In some embodiments, the cluster management system 107 receives a copy of a user program from the client 102 and sends a copy of the user program to the worker systems 106. In some embodiments, the cluster management system 107 coordinates the parallel execution of the user program on the worker systems 106 and reports the results of the execution to the client 102.

The master system 105 is a computing device with a processor and a memory. In some embodiments, the master system 105 receives information identifying the graph data on the distributed storage system 103 and assigns partitions of the graph data to the worker systems 106. More specifically, the master system 106 sends each worker system 106 information that uniquely describes its assigned graph partition and information enabling the worker system 106 to obtain its assigned graph partition. For example, the master system 106 sends a worker system 106 a unique file name corresponding to its assigned graph partition and the location of the file on the distributed file system 103. A worker system 106 may be assigned one or more graph partitions.

The master system 105 includes a coordination module 114 that executes a copy of the user program that acts as a master or coordinator for the execution of the copies of the user program on the worker systems 106.

The coordination module 114 maintains a list of worker systems 106 that participate in a computation. The worker systems 106 send registration messages to the master system 105 and the coordination module 114 registers the worker systems 106 by assigning unique identifiers to the worker systems 106. The coordination module 114 maintains a list of the registered worker systems 106 which includes the identifiers of the registered worker systems 106 and the addressing information of the registered worker systems 106. For a respective registered worker system 106, the list includes information identifying one or more assigned graph partitions. In some embodiments, the coordination module 114 sends each worker system 106 the list of the registered worker systems 106.

In some embodiments, the coordination module 114 assigns one or more partitions to each worker system 106, and sends each worker system 106 information identifying its assigned one or more partitions. A partition of a graph includes a subset of the vertices and edges of the graph. In some embodiments, the coordination module 114 determines the number of graph partitions. The number of partitions may be specified in the user program or determined by a partition function stored in the coordination module 114. For example, the default partitioning function may be a hash of a vertex identifier modulo N, where N is the number of partitions. The master system 105 is not assigned any portion of the graph.

In some embodiments, the coordination module 114 sends each worker system 106 a copy of the user program and initiates the execution of the user program on the worker systems 106. In some embodiments, the coordination module 114 signals the beginning of a superstep. The coordination module 114 maintains statistics about the progress of a computation and the state of the graph, such as the total size of the graph, the number of active vertices, the timing of recent supersteps, and the message traffic of recent supersteps.

The coordination module 114 also handles fault tolerance. Fault tolerance is achieved through checkpointing. At the beginning of a superstep, the coordination module 114 instructs the worker systems 106 to save the state of their partitions to persistent storage, including vertex values, edge values, and incoming messages. Worker failures are detected through messages that the coordination module 114 periodically sends to the worker systems 106. If the coordination module 114 does not receive a reply message from a worker system 106 after a specified interval, the coordination module 114 marks that worker system 106 as failed. If a worker system 106 does not receive a message from the coordination module 114 after specified time interval, the worker system 106 terminates its processes. When a worker system 106 fails, the current state of the partitions assigned to the worker system 106 is lost. In order to recover from a worker system 106 failure, the coordination module 114 reassigns graph partitions to the currently available set of worker systems 106 at the beginning of a superstep. The available set of worker systems 106 reload their partition states from the most recent available checkpoint at the beginning of a superstep. The most recent available checkpoint may be several supersteps earlier than the latest superstep completed by any worker system 106 before the failure, which results in the missing supersteps being repeated. The frequency of checkpointing may be based on a mean time of failure which thereby balances checkpointing cost against expected recovery cost.

After the supersteps are finished, the coordination module 114 aggregates results from the worker systems 106 and sends the results to the distributed storage system 103. In some embodiments, the results include a set of values explicitly output by the vertices. These values describe, e.g., one or more of the shortest paths between vertices in the graph. In some embodiments, the coordination module 114 writes one result file per graph partition and stores the result files with the graph partitions in the distributed storage system 103. The coordination module 114 sends a notification to the client 102 including the location of the results.

A worker system 106 is a computing device with a processor and a memory. The worker systems 106 and the master system 105 are similar types of systems in one embodiment. A worker system 106 includes a worker module 112 that stores one or more graph partitions. The worker module 112 may obtain the one or more graph partitions from the distributed system 103. In some embodiments, the worker module 112 stores information identifying one or more graph partitions. The worker module 112 also stores and executes a copy of the user program on the one or more partitions stored on the worker system 106.

The worker module 112 executes supersteps of a user program in response to receiving instructions from the master system 105 and/or cluster management system 107. During a superstep, the worker module 112 executes an algorithm for each active vertex in the one or more partitions stored on the worker module 112. A vertex that is active during a superstep may send messages to other vertices in order to obtain information about other vertices or edges, to add or remove vertices or edges, and to modify vertices or edges. During execution of a superstep, the worker module 112 may retrieve and/or modify graph data stored on the distributed storage system 103. When the superstep is finished, the worker module 112 sends a message to the master system 105 indicating the number of vertices that will be active in the next superstep. The superstep continues as long as there are active vertices or there are messages in transit. When the supersteps are finished, the worker module 112 sends the results generated from the user program to the master system 105.

The worker module 112 stores the state of its assigned one or more partitions. This may include the state of each vertex in the one or more partitions where the state of each vertex consists of its current value, a list of its outgoing edges (which includes the vertex name for the edge's destination and the edge's current value), a queue containing incoming messages, and a flag specifying whether the vertex is active.

The network 140 represents the communication pathways between the client 102, the master system 105 and the worker systems 106. In one embodiment, the network 140 uses one or more network communications technologies and/or protocols. Thus, the network 140 may include links using technologies such as Ethernet, IEEE 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. In an embodiment, network 140 may include the Internet. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
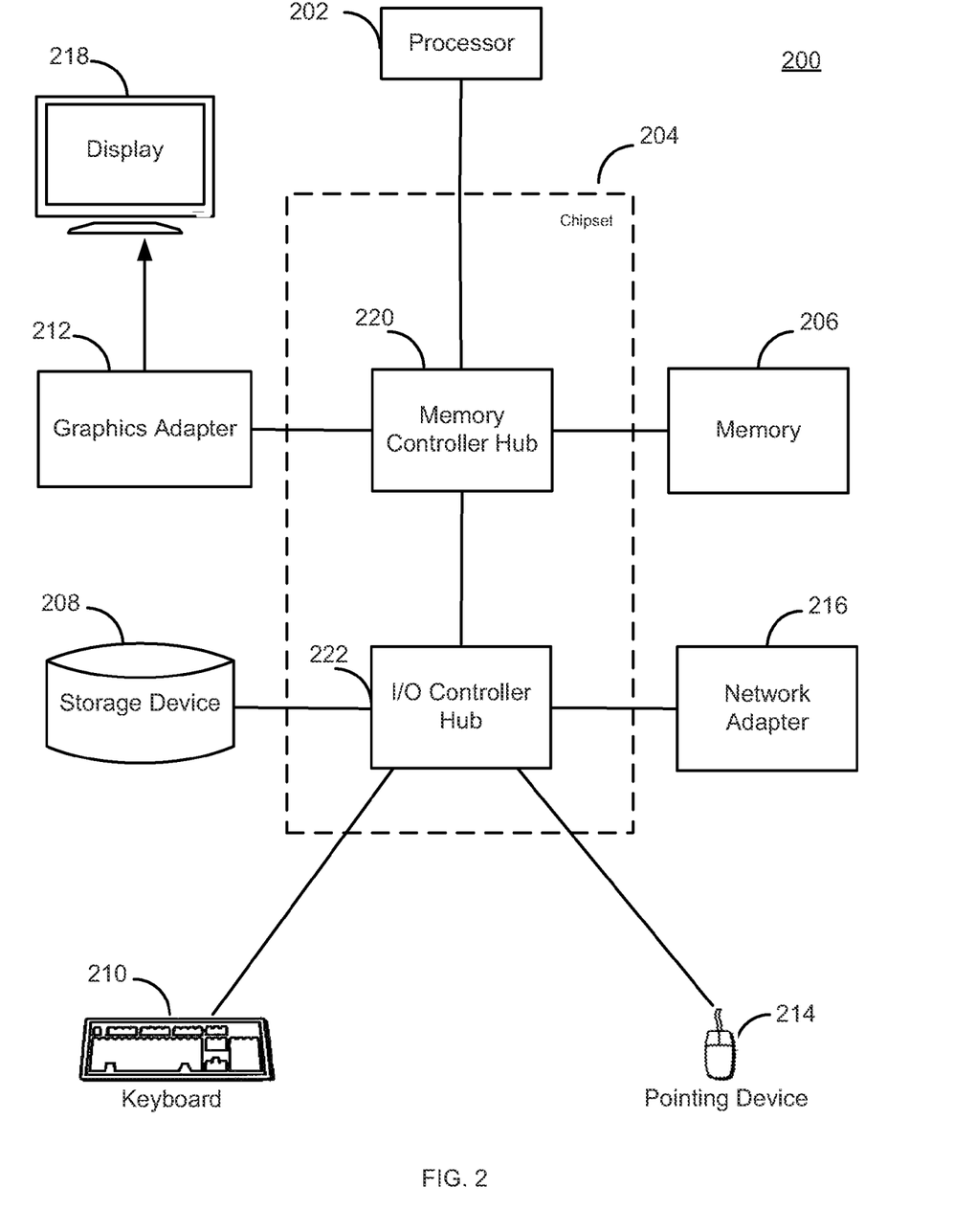
FIG. 2 is a high-level block diagram illustrating an example of a computer, according to one embodiment.

FIG. 2 is a high-level block diagram illustrating physical components of a computer 200 used as part of the client 102, master system 105 and/or worker system 106 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204. In some embodiments, memory 206 includes high-speed random access memory, such as DRAM, SRAM, DDR RAM or other random access solid state memory devices.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and may be used in combination with the keyboard 210 to input data into the computer 200. The graphics adapter 212 displays images and other information on the display 218. The network adapter 216 couples the computer 200 to the network 140.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
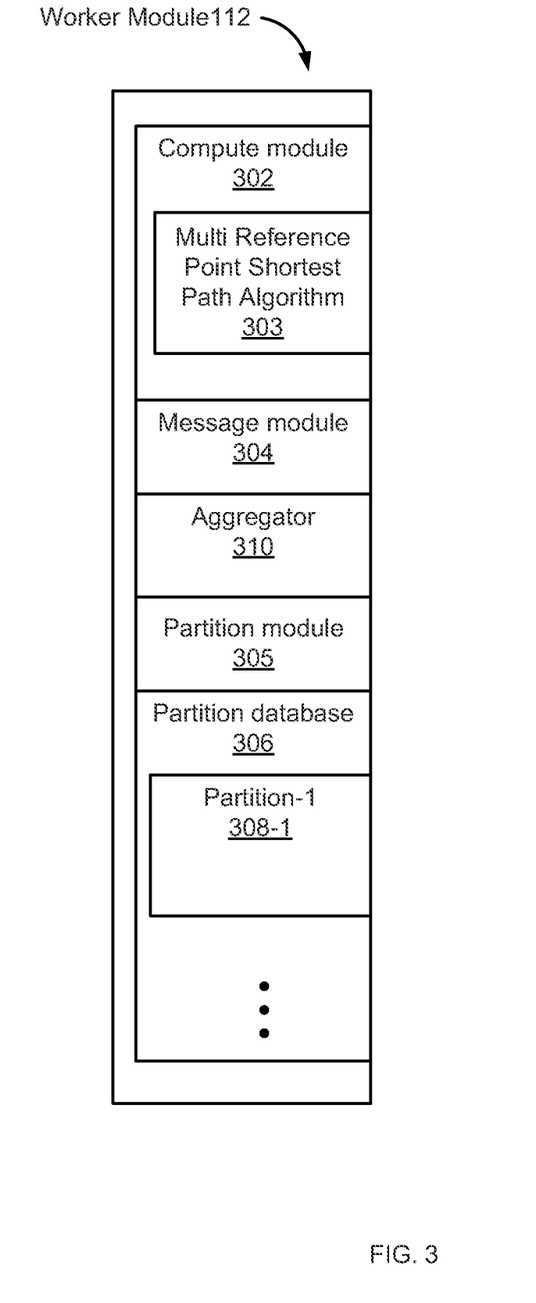
FIG. 3 is a high-level block diagram illustrating modules within a worker system, according to one embodiment.

FIG. 3 is a high-level block diagram illustrating modules within the worker module 112 of a worker system 106, according to one embodiment. In some embodiments, modules access one or more partitions of the graph stored on the distributed storage system 103, execute a copy of the user program, and modify the one or more partitions of the graph responsive to operations of the user program.

The worker module 112 includes a partition module 305 that manages the data in the partition database 306. The partition module 302 may retrieve one or more graph partitions and store the retrieved partitions in the partition database 304. In some embodiments, the partition module 302 retrieves the one or more graph partitions from the distributed system 103 based on information received from the client 102 and/or master system 105. In some embodiments, the partition module 305 receives information describing a partition of a graph and stores the information in the partition database 306. More specifically, the partition module 305 receives information identifying one or more graph partitions and the location of the graph partitions on the distributed storage system 103. The partition module 305 saves the state of the partitions 308 in the partition database 306 in response to messages from the master system 105. In some embodiments, the partition module 305 retrieves and/or modifies graph data on the distributed storage system 103 on behalf of the other modules of the worker module 112.

The worker module 112 includes a partition database 306 that stores one or more graph partitions 308. The one or more graph partitions 308 may be copies of graph partitions stored on the distributed system 103. In some embodiments, the partition database 306 stores information identifying the locations of one or more graph partitions on the distributed storage system 103.

As discussed above, the distributed storage system 103 stores the data describing the graph. The data for the vertices, stored by the distributed storage system 103, include vertex names and vertex values. The data for the edges, stored by the distributed storage system 103, includes edge destination names and edge values. In some embodiments, the edge values indicate a distance or cost of traveling between two vertices. For example, when the graph corresponds to a geographic map and the vertices correspond to cities, the edge values may indicate distances between the cities.

The worker module 112 includes a message module 304 that sends messages from one vertex to another vertex during a superstep. A vertex may send messages to another vertex on a different worker system 106. The vertices may send messages to other vertices in order to obtain information about other vertices, to add or remove vertices or edges, and to modify vertices and edges. In one embodiment, the message module 304 stores and manages message queues for vertices in the partitions 308 stored in the partition database 306. In some embodiments, the message module 304 maintains an incoming message queue for each vertex for the current superstep and an incoming message queue for the next superstep. In some embodiments, the message module 312 maintains a single incoming message queue for all of the vertices in the partition or all of the vertices in all partitions assigned to a worker system 106.

The messages include a message value and the name of the destination or target vertex. The value of a message depends on the function or algorithm that generated the message or the data contained in the graph. For example, messages used in a multiple reference point shortest path algorithm may contain information about distances between vertices.

In some embodiments, the message module 304 stores and manages an outgoing message queue for a vertex. The messages in the outgoing message queue may be transmitted once the queue reaches a threshold size. The message module 304 is also responsible for sending and responding to messages from the master system 105. As discussed above, the master system 105 periodically sends messages to the worker systems 106 to check on the status of a computation.

The worker module 112 includes an aggregator 310 that is responsible for global communications. The aggregator 310 enables a vertex to send a message to each vertex of the graph. During a superstep, the aggregator 310 receives messages from the vertices, combine the messages, and send the messages to each vertex in the graph.

The compute module 302 executes the multiple reference point shortest path algorithm 303 on a directed graph in order to determine the shortest paths from a source vertex to all other vertices in the graph. The algorithm 303 may be a part of the user program received from the client device 102. The directed graph models a real-world condition and may represent, for example, a geographic map, computer network, or social network. The edges of the directed graph are labeled with values describing the cost of traversing the edge, such as distances or times. The source vertex is identified by the user program and may depend on the real-world problem being modeled by the directed graph. For example, when the directed graph represents a geographic map, the source vertex may be a city, and the algorithm 303 may determine the shortest paths from the city to other cities.

At a high level, the multiple reference point shortest path algorithm executes in parallel on multiple vertices of a directed graph. The multiple reference points send information about updated paths to the source vertex to each vertex in the graph. The parallelism and reference points reduce the run time to compute the shortest paths. The algorithm is discussed in more detail in the discussion of FIG. 4.

The compute module 302 saves the output from the multiple reference point shortest path algorithm to the distributed storage system 103. More specifically, the compute module 302 saves the distance values output by the vertices. For example, each vertex may output its shortest distance to a source vertex.

Figure 4:
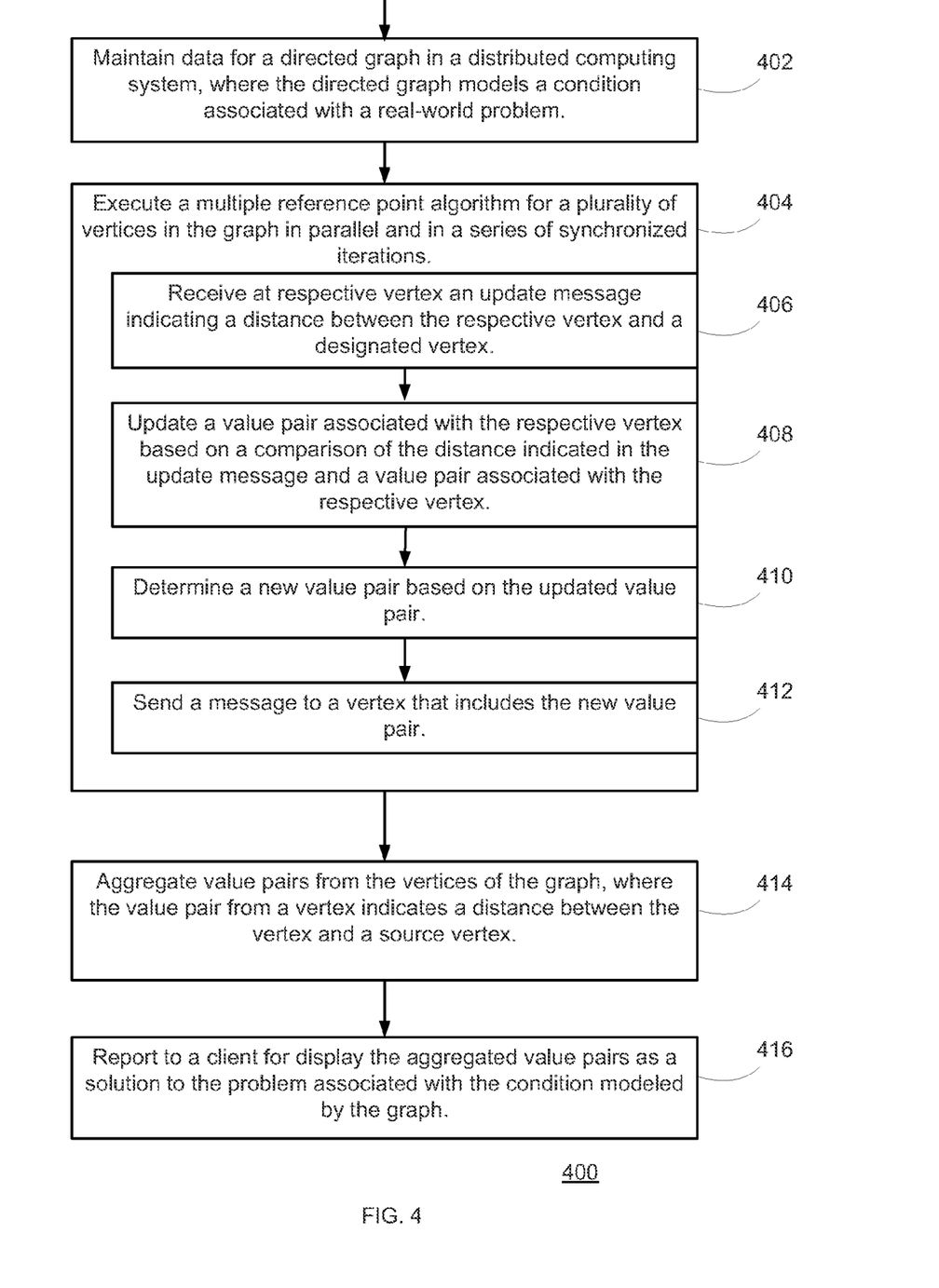
FIG. 4 is a flow diagram that illustrates a process for the multiple reference point shortest path algorithm, according to one embodiment.

FIG. 4 is a flow diagram that illustrates a process for performing a multiple reference point shortest path algorithm on a directed graph, in accordance with one embodiment. This process 400 is performed by a server system (e.g., worker system 106) having one or more processors and non-transitory memory. The non-transitory memory stores one or more programs to be executed by the one or more processors. The one or more programs include instructions for process 400.

In this process, data for a directed graph is maintained 402 in a distributed computer system. As discussed above, the directed graph models a real-world condition and may represent, for example, a geographic map, computer network, or social network. The real-world condition has an associated problem which can be solved by determining the shortest distance between an item represented by a source vertex and one or more other items represented by other respective vertices in the directed graph. For example, the problem associated with a graph describing a network topology may include determining the shortest routes from a node in the network to the other nodes in the network. The data for the directed graph are maintained in one or more graph partitions.

The maintained data designates a source vertex and a set of reference vertices. The source vertex is typically specified by the user program; the user program may also specify the reference vertices or the reference vertices may be selected randomly (e.g., pseudo-randomly). The reference vertices are a subset of the vertices in the graph and may be located on one or more graph partitions on one or more worker systems 106. The set of reference vertices is small in proportion to the number of vertices in the graph. In some embodiments, the reference vertices correspond to a predefined percentage of vertices in the graph. For example, the reference vertices may correspond to 1% of the vertices in the graph. As used herein, the source vertex and the reference vertices may be referred to as designated vertices.

Each vertex in the graph stores a set of value pairs. In some embodiments, each vertex stores value pairs for the source vertex and the set of reference vertices. For example, if the source vertex and the set of reference vertices are vertex A, vertex B, and vertex C, each vertex stores a value pair for vertex A, vertex B, and vertex C. Each vertex value pair includes an identifier or name value of a vertex and a distance value that indicates the distance to the vertex corresponding to the identifier or name value. For example, a value pair of A:10 indicates that a respective vertex is a distance of 10 away from vertex A. The distance values are initially assigned a placeholder value such as infinity or some value larger than the sum of all the edge values in the graph.

The multiple reference point algorithm is executed 404 in parallel for a plurality of vertices in the graph and in a series of synchronized iterations. The multiple reference point algorithm identifies the shortest distances between a source vertex and each of the vertices in the graph. In some embodiments, the multiple reference point algorithm is executed for each vertex in the graph in parallel. An iteration corresponds to a superstep discussed above.

In some embodiments, the operations of the algorithm start at the source vertex and the set of reference vertices. In some embodiments, in the first iteration or superstep of the algorithm, the source vertex and each of the reference vertices updates the value pair corresponding to itself and sends an update message to each of its neighbor vertices (i.e., vertices connected by an edge) containing the updated value pair. In particular, a source vertex and a reference vertex updates the distance value of the value pair corresponding to itself from the placeholder value to zero. For example, a vertex Y changes the value pair Y:∞ to Y:0. When the graph is a directed graph, a first vertex is a neighbor of a second vertex if there is an outgoing edge from second vertex to the first vertex. The update message includes a value pair that includes the name of the sending vertex and a distance value that is the sum of sending vertex's distance to itself and the edge value of the edge connecting the vertices. For example, in the first superstep, when the edge value between a vertex and a neighbor vertex is 17 miles and the vertex's distance to itself is zero, the vertex sends the neighbor vertex its name and a distance value of 17 miles. The value pair received by the neighbor vertex indicates the neighboring vertex's potential minimum distance to the source vertex or a reference vertex.

At a high level, the operations for the algorithm for a respective vertex during an iteration or superstep include: receiving update messages containing value pairs that represent potential minimum distances between vertices, updating one or more value pairs associated with the respective vertex based on the value pairs contained in the received messages, and sending new update messages containing new value pairs based on the updated values pairs.

The operations performed at a respective vertex during an iteration include receiving 406 an update message. The update message indicates a distance between the respective vertex and the source vertex or a reference vertex. In some embodiments, the update message includes a value pair. The respective vertex receives one or more update messages at the beginning of an iteration or superstep. An update message may be sent from a vertex connected to the respective vertex by an edge or from a designated vertex. In some embodiments, the update message includes a value pair that includes a name value of a the source vertex or a reference vertex and a distance value. In some embodiments, the update message further includes a classification value indicating whether the update message is a local update message or a global update message. A local update message may be sent by any vertex connected to the respective vertex. A global update message is sent by a reference vertex.

When the update message is a local update message, the name value identifies a source vertex or a reference vertex and the distance value indicates the respective vertex's potential minimum distance to the identified vertex. For example, a local update message received by vertex C may include the value pair D:6 which indicates that vertex C is a distance of 6 away from vertex D.

When the update message is a global update message, the value pair contained in the message indicates a respective vertex's distance to the source vertex relative to its distance to a reference vertex. For example, a vertex C may receive a global update message containing a value pair D:8 which indicates that vertex C's distance to the source vertex is vertex C's distance to reference vertex D plus eight.

The operations performed at a respective vertex during an iteration include updating 408 a value pair associated with the respective vertex corresponding to the source vertex or a reference vertex based on a comparison of the distance of value pair in the update message and a value pair associated with the respective vertex. The respective vertex updates the distance value of its value pair if a corresponding value pair in the update message includes a shorter distance value.

The value pair updated depends on whether the update message is a local update message or a global update message. When the update message is a local update message, the respective vertex updates its value pair corresponding to value pair included in the local update message. Stated in another way, the respective vertex updates its value pair having a name value that corresponds to the name value of the value pair included in the update message. For example, if the local update message includes the value pair D:10, the respective vertex updates its value pair corresponding to vertex D. In this example, if respective vertex includes the value pair D:15 and the update message includes the value pair D:10, the respective vertex updates the distance value of its value pair to D:10. As discussed above, the value pair in a local message received by a respective vertex indicates the respective vertex's potential minimum distance to the source vertex or a reference vertex.

When the update message is a global update message, the respective vertex updates its value pair corresponding to the source vertex. As discussed above, when the update message is a global update message, the value pair contained in the global update message represents a respective vertex's potential minimum distance to the source vertex. The value pair contained in the global update message represents a distance to the source vertex relative to a reference vertex. For example, the global update message may include the value pair E:10, which indicates that the respective vertex's distance to the source vertex is its distance to reference vertex E plus ten. The respective vertex updates its value pair corresponding to the source vertex if its value pair for the source vertex has a distance value that is greater than the potential minimum distance represented by the value pair included in the global update message. Stated in another way, the respective vertex updates its distance to the source vertex if the global update message includes a shorter distance to the source vertex. For example, if the respective vertex includes a value pair A:24 corresponding to the source vertex and another value pair E:10, and if the global update message includes the value pair E:12, the respective vertex updates the value pair corresponding to the source vertex to E:22 because the relative distance value represented by the value pair in the global update message (i.e., 12+10) is less than the respective vertex's previous distance to the source vertex (i.e., 24).

The operations performed at a respective vertex during an iteration include determining 410 a new value pair based on the updated value pair. The new value pair includes a name value and a distance value. The name value and the distance value of the new value pair is determined based on whether the respective vertex is a reference vertex and whether the updated value pair corresponds to the source vertex. If the current vertex is not a reference vertex ("non-reference vertex"), the current vertex prepares local update messages for each of its neighbor vertices. The new value pair sent to a neighbor vertex includes the name value of the updated value pair and a distance value that is determined based in part on the distance value of the updated value pair and the edge value of the edge connecting the vertices. In particular, the new value pair sent to a neighbor vertex includes a distance value that is the sum of the distance value of the updated value pair and the edge value of the edge connecting the respective vertex and the neighbor vertex. For example, if the respective vertex includes an updated value pair of F:10 and the edge value between the respective vertex and a neighbor vertex is four, the respective vertex prepares an update message that includes the value pair F:14.

If the respective vertex is a reference vertex and the value pair corresponding to the source vertex is not updated, the respective vertex performs the operations described above with respect to a non-reference vertex. If the respective vertex is a reference vertex and if a value pair corresponding to the source vertex is updated, the respective vertex determines a new value pair based on its relative distance to the source vertex. In particular, the respective vertex generates a new value pair including a name value corresponding to the respective vertex and a distance value corresponding to the respective vertex's distance to the source vertex. For example, a reference vertex B may prepare a new value pair B:10 which indicates vertex B's distance to the source vertex.

The operations performed at a respective vertex during an iteration further include sending 412 a message to a vertex that includes the new value pair. In some embodiments, the respective vertex sends a message to each of its neighbor vertices. Messages that are sent to neighbor vertices are local update messages. As discussed above, a message sent from the respective vertex to its neighbor vertex includes a distance value that is the sum of the distance value of the updated value pair and the edge value of the edge connecting the respective vertex and the neighbor vertex.

In some embodiments, the respective vertex sends a message to each vertex in the graph. In particular, if the respective vertex is a reference vertex and its value pair corresponding to the source vertex is updated, the respective vertex sends a global update message to the aggregator 310 which sends the global update message directly to every vertex in the graph. Stated in another way, when a reference vertex has an updated distance to the source vertex, the reference vertex broadcasts its updated distance to the source vertex directly to each vertex in the graph. An advantage of a global message is that it can be sent directly to any vertex during a superstep regardless of the distance between the sending vertex and the distance vertex. In contrast, a local message travels between neighboring vertices during a superstep. Using local messages, propagating an updated distance throughout the graph could take numerous supersteps or iterations depending on the number of vertices in the graph. The global messages sent by the reference vertices can update all of the vertices in the graph with updated distances to the source vertex using fewer iterations or supersteps. In particular, updating the vertices using global messages uses two iterations, one iteration for the reference vertex to send the global update message and another iteration for the vertices to receive the global update message and to update their respective distances. This way, the vertices in the graph are updated using a minimal amount of processing time. Therefore, by having multiple reference vertices, updated distances to the source vertex can be quickly propagated throughout the graph.

As discussed above, the value pairs included in the global update messages include a value pair representing a reference vertex's distance to the source vertex. A vertex that receives a global message can infer its own distance to the source vertex based on its distance to the reference vertex and the reference vertex's distance to the source vertex. For example, reference vertex B may send a global update message to non-reference vertex C that contains the value pair B:5, which indicates that vertex C's distance to source vertex A is vertex C's distance to reference vertex B plus five. In this example, if vertex C has value pairs of A:100 and B:10, vertex C updates its value pair for source vertex A to A:15 because the value pair B:5 from the global update message represents a shorter distance (i.e., 15) to the source vertex than the previous value (i.e., 100).

The algorithm terminates when there are no more update messages to be sent or after a predefined number of iterations. After the algorithm terminates, value pairs from the vertices of the graph are aggregated 414. In particular, after the algorithm terminates, each respective vertex includes a value pair that includes the respective vertex's distance to the source vertex. In some embodiments, each vertex sends a value pair to the master system 105, where the value pair identifies the vertex and the vertex's shortest distance to the source vertex. The output from a vertex represents the vertex's shortest distance to the source vertex. Collectively, the output from the vertices represents the shortest paths from the source vertex to the other vertices, and represents a solution to the real-world problem associated with the conditions modeled by the graph. The aggregated value pairs representing the solution are reported 416 to the client 102 for storage, display and/or other purposes.

FIGS. 5A-5G illustrates an example of the operations of the multiple reference point shortest path algorithm on directed graph 500. The algorithm determines the shortest paths to a source vertex and is executed in parallel on each vertex in a series of synchronized iterations. The directed graph 500 shown in FIG. 5A, includes a source vertex A and reference vertex E. The edges connecting the vertices of the directed graph 500 each include a value which indicates a distance between respective vertices. Although not shown, each vertex stores a list of value pairs that correspond to the source vertex A and reference vertex E. More specifically, each vertex stores a value pair for source vertex A and a value pair for reference vertex E. FIGS. 5B-5G illustrate operations performed at the vertices during respective iterations or supersteps.

Figure 5A:
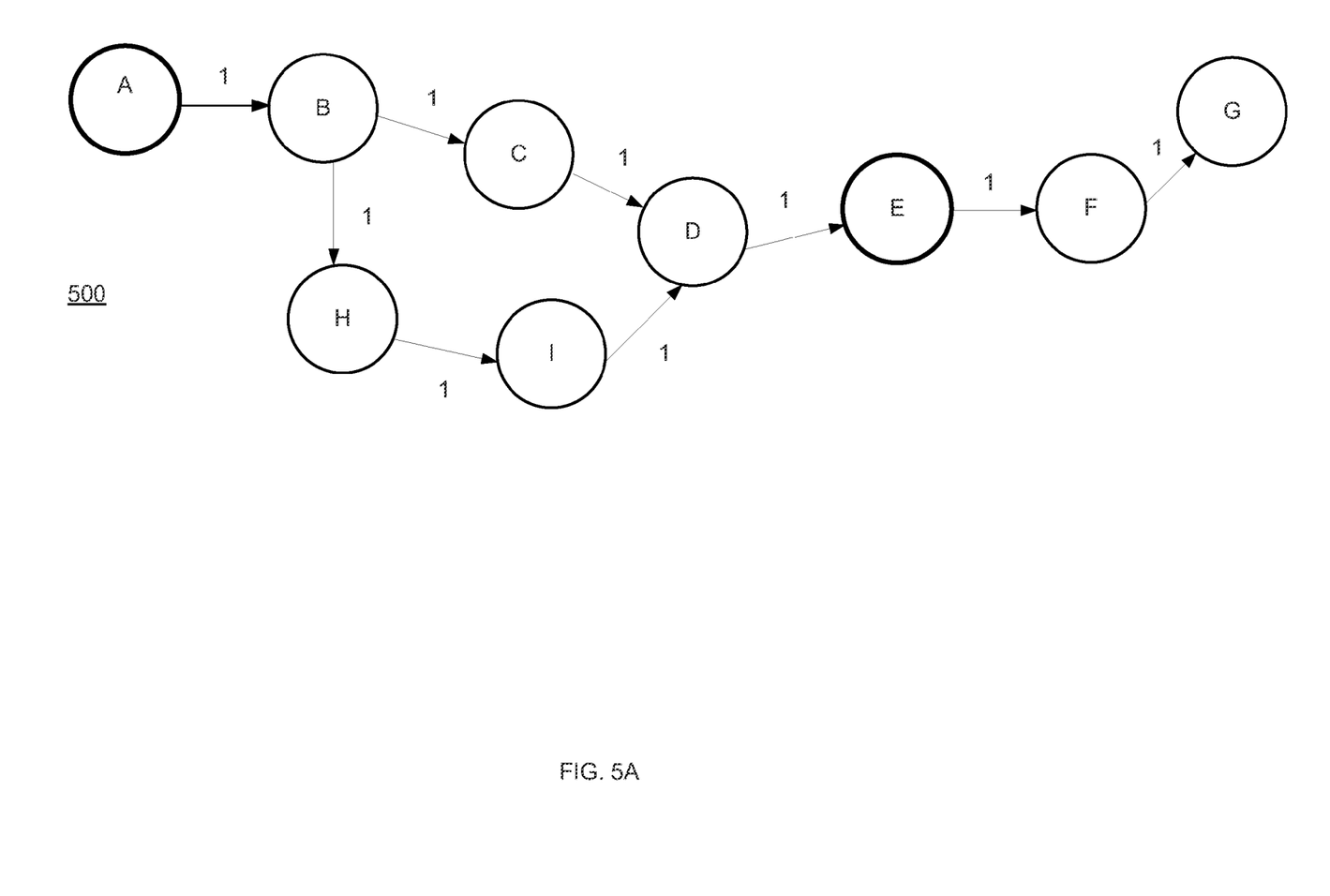
FIG. 5A-FIG. 5G illustrate an example of the operations of the multiple reference point shortest path algorithm on a directed graph, according to one embodiment.
Figure 5B:
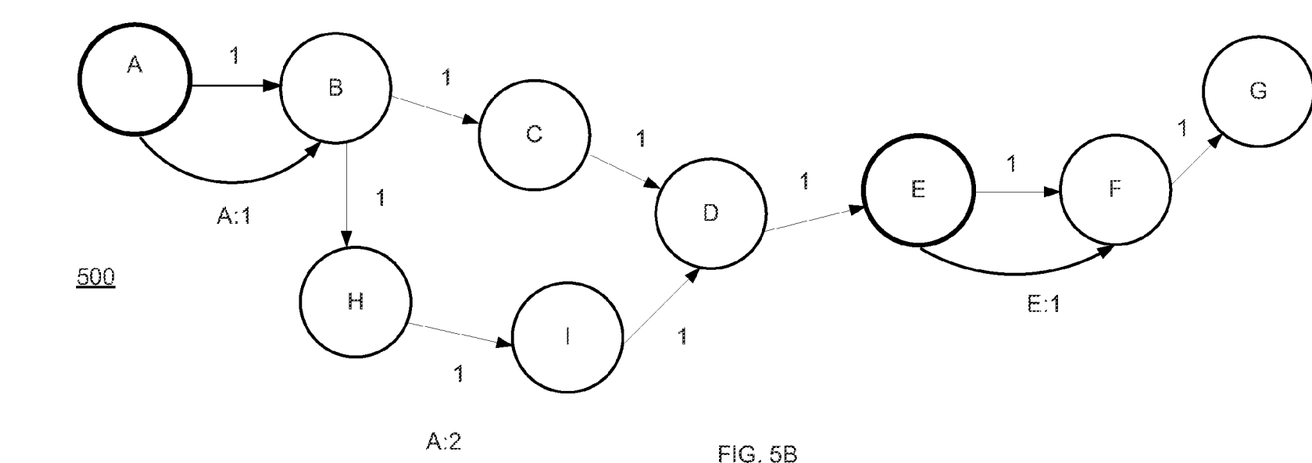

When the algorithm starts, the source vertex A and the reference vertex E changes their distances to themselves from the placeholder value to zero and sends each of its neighbor vertices an update message. In FIG. 5B, source vertex A sends an update message to vertex B and reference vertex E sends an update message to vertex F. An update message includes a value pair that includes the name of the source vertex or a reference vertex, and a distance value that indicates a distance to the vertex. In the initial step of the algorithm, the distance value is the value of the edge connecting the two vertices. For example, the value pair sent from reference vertex E to vertex F is E:1 which indicates that vertex F has a distance of 1 to reference vertex E. The vertices that received update messages (i.e., vertex B and vertex F) compare the value pairs from the update messages to their own value pairs in order to find shorter distances to the source vertex and the reference vertices. For example, if vertex F has the value pair of E:∞ and receives an update message including the value pair E:1, vertex F updates its value pair to E:1.

Figure 5C:
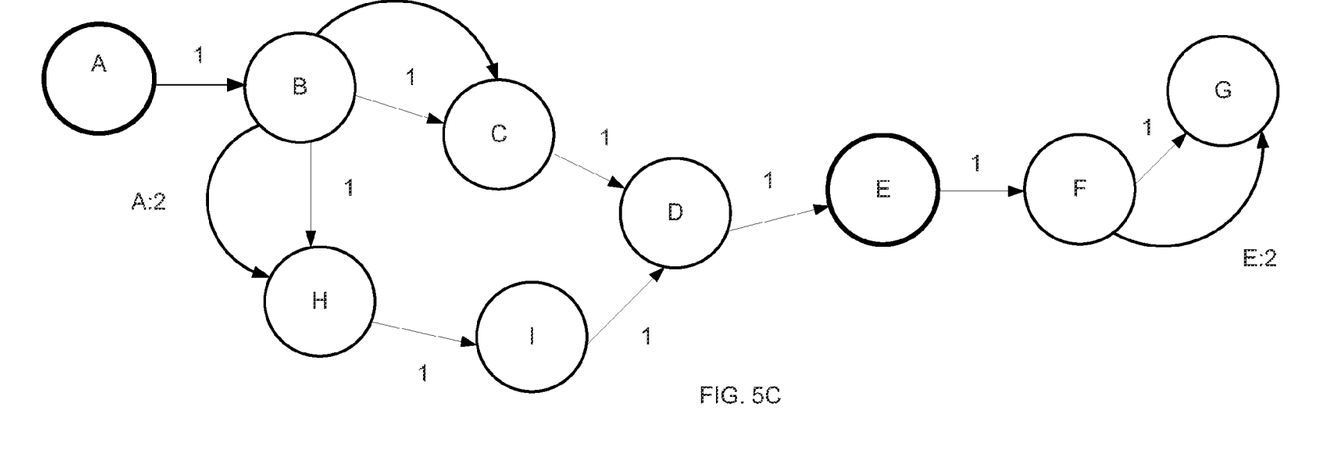
Figure 5D:
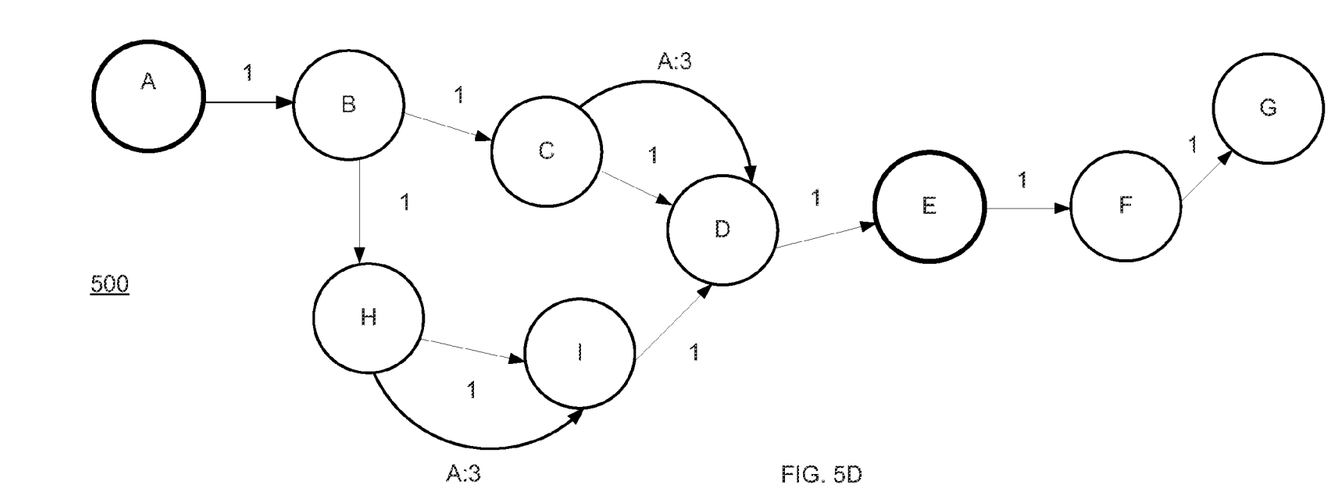
Figure 5E:
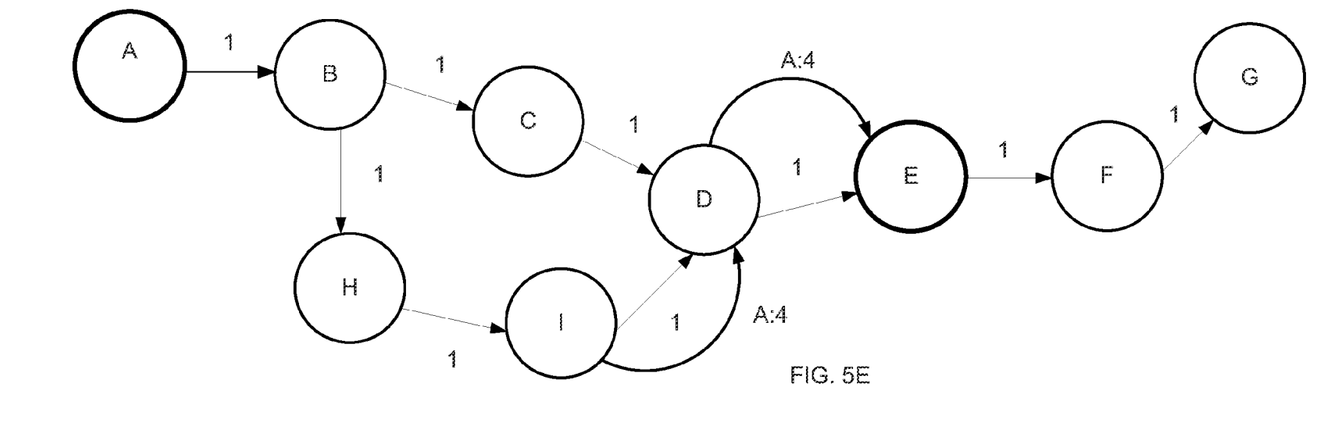

If a non-reference vertex updates one or more value pairs, the non-reference vertex sends local update messages containing updated value pairs to its neighbor vertices. As discussed above, the updated value pairs are based on the edge values connecting the vertices. In FIG. 5C, vertex F sends an update message to vertex G and vertex B sends update messages to vertex C and vertex H. In FIG. 5D, vertex C sends an update message to vertex D and vertex H sends an update message to vertex I. It is noted that vertex D receives the value pair of A:3 from vertex C, which represents vertex D's minimum distance to source vertex A. In FIG. 5E, vertex D sends an update message to reference vertex E and vertex I sends an update message to vertex D. In FIG. 5E, vertex D receives the value pair of A:4 from vertex I but retains the shorter value pair A:3 received in the previous superstep (shown in FIG. 5D) from vertex C as vertex D's distance to source vertex A.

Figure 5F:
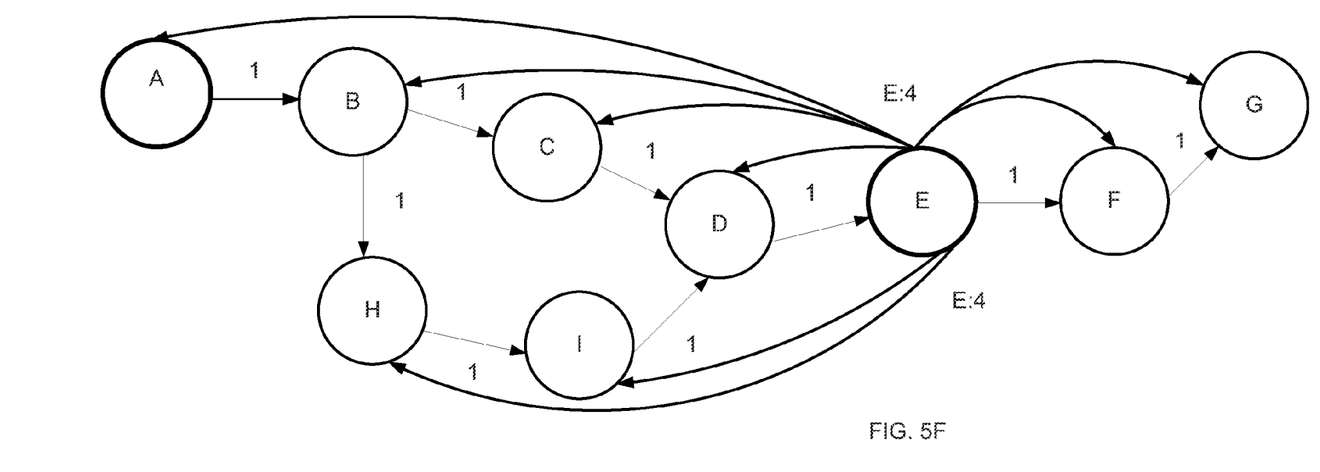

In FIG. 5E, reference vertex E receives a value pair A:4 corresponding to the source vertex A. As discussed above, when a reference vertex receives an updated path to the source vertex, the reference vertex sends a global update message to each vertex in the graph. As shown in FIG. 5F, reference vertex E sends a global message to each vertex in the graph 500. As discussed above, the global update message contains a value pair that includes a reference vertex's distance to the source vertex. In this example, reference vertex E sends out a value pair of E:4 to indicate that that vertex E is a distance of 4 away from source vertex A. Global messages reach all of the vertices of the graph faster than local messages because global messages can be sent to any vertex while a local message can only be sent by a vertex to a neighboring vertex. In the superstep of FIG. 5F, the value pair of E:4 in the global message sent from reference vertex E causes vertex G to update its value pair to A:6 in a subsequent superstep. Vertex G, being two edges away from vertex E, would have received the value pair A:6 in a local message two supersteps after the superstep of FIG. 5F. The global message sent in the supserstep shown in FIG. 5F thus saves a superstep. This way, fewer supersteps and processing time is necessary to determine the shortest paths between the source vertex and each other vertex in the graph. For large graphs, the amount of processing time saved would be significant.

Figure 5G:
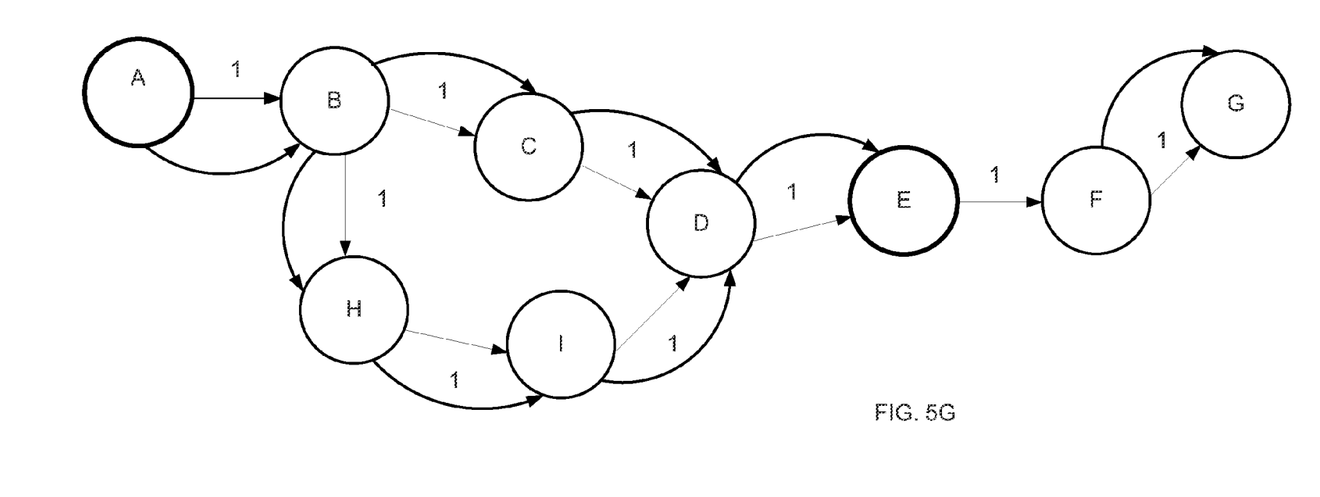

As shown in FIG. 5G, the update messages sent by vertex E may cause the vertices to send subsequent update messages to be sent throughout the graph 500. In particular, in FIG. 5G, after receiving the global update message from reference vertex E and updating their value pairs, the non-reference vertices send update messages to their neighbor vertices. The algorithm ends when there are no more update messages to be sent or after a predefined number of iterations.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for processing digital documents and reformatting them for display on client devices. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method comprising:
maintaining data in a distributed computing system, the data describing a directed graph representing relationships among items, having a plurality of vertices representing the items, having edges with values representing distances between the items;
designating a portion of the plurality of vertices as one or more reference vertices;
executing a multiple reference point algorithm for the plurality of the vertices in the directed graph in parallel for a series of synchronized iterations to determine shortest distances between the plurality of vertices and a source vertex, wherein operations of the multiple reference point algorithm for a respective vertex of the plurality of vertices during an iteration include:
  receiving an update message indicating a distance between the respective vertex and a designated vertex of a set of designated vertices, wherein the set of designated vertices comprises the source vertex and the reference vertices;
  updating a value pair associated with the respective vertex and indicating a distance from the respective vertex to the designated vertex, the updating occurring based on a comparison of the distance indicated in the update message and the distance indicated by the value pair associated with the respective vertex;
  determining a new value pair based on the updated value pair; and
  sending a message including the new value pair to one or more other vertices in the directed graph, wherein the message is a global update message sent directly to all vertices in the plurality of vertices if the respective vertex is one of the one or more reference vertices and the updated value pair indicates a distance from the respective vertex to the source vertex;
aggregating value pairs associated with the plurality of vertices of the directed graph, the aggregated value pairs indicating shortest distances from the plurality of vertices to the source vertex; and
outputting the aggregated value pairs.

2. The method of claim 1, wherein the received update message further comprises a classification value indicating whether the update message is a local update message or a global update message.

3. The method of claim 2, wherein the classification value for the update message indicates that the update message is a local update message sent from a vertex connected to the respective vertex by an edge.

4. The method of claim 3, wherein the comparison includes comparing the distance value indicated in the update message and a distance value of the value pair associated with the respective vertex, wherein the distance value of the value pair associated with the respective vertex is updated with the distance pair included in the update message when the distance indicated in the update message is less than the distance value of the value pair associated with the respective vertex.

5. The method of claim 3, wherein the new value pair comprises a name value of the updated value pair and a new distance value, the new distance value based on a distance value of the updated value pair and an edge value of an outgoing edge of the respective vertex.

6. The method of claim 1, wherein the message is sent to a vertex connected to the respective vertex by an outgoing edge of the directed graph.

7. The method of claim 2, wherein the classification value for the update message indicates that the update message is a global update message, the update message further indicating a reference vertex, and the distance indicated in the update message measures a distance between the respective vertex and the source vertex relative to the respective vertex's distance to the reference vertex.

8. The method of claim 7, wherein the updated value pair associated with the respective vertex corresponds to the source vertex and wherein a distance value for the updated value pair is updated based on the distance indicated in the update message and a distance value of a value pair associated with the respective vertex corresponding to the reference vertex.

9. A non-transitory computer readable storage medium storing executable computer program instructions, the instructions comprising instructions for:
   maintaining data in a distributed computing system, the data describing a directed graph representing relationships among items, having a plurality of vertices representing the items, having edges with values representing distances between the items;
   designating a portion of the plurality of vertices as one or more reference vertices;
   executing a multiple reference point algorithm for the plurality of the vertices in the directed graph in parallel for a series of synchronized iterations to determine shortest distances between the plurality of vertices and a source vertex, wherein operations of the multiple reference point algorithm for a respective vertex of the plurality of vertices during an iteration include:
      receiving an update message indicating a distance between the respective vertex and a designated vertex of a set of designated vertices, wherein the set of designated vertices comprises the source vertex and the reference vertices;
      updating a value pair associated with the respective vertex and indicating a distance from the respective vertex to the designated vertex, the updating occurring based on a comparison of the distance indicated in the update message and the distance indicated by the value pair associated with the respective vertex;
      determining a new value pair based on the updated value pair; and
      sending a message including the new value pair to one or more other vertices in the directed graph, wherein the message is a global update message sent directly to all vertices in the plurality of vertices if the respective vertex is one of the one or more reference vertices and the updated value pair indicates a distance from the respective vertex to the source vertex;
   aggregating value pairs associated with the plurality of vertices of the directed graph, the aggregated value pairs indicating shortest distances from the plurality of vertices to the source vertex; and
   outputting the aggregated value.

10. The non-transitory computer readable storage medium of claim 9, wherein the received update message further comprises a classification value indicating whether the update message is a local update message or a global update message.

11. The non-transitory computer readable storage medium of claim 10, wherein the classification value for the update message indicates that the update message is a local update message sent from a vertex connected to the respective vertex by an edge.

12. The non-transitory computer readable storage medium of claim 11, wherein the comparison includes comparing the distance value indicated in the update message and a distance value of the value pair associated with the respective vertex, wherein the distance value of the value pair associated with the respective vertex is updated with the distance pair included in the update message when the distance indicated in the update message is less than the distance value of the value pair associated with the respective vertex.

13. The non-transitory computer readable storage medium of claim 11, wherein the new value pair comprises a name value of the updated value pair and a new distance value, the new distance value based on a distance value of the updated value pair and an edge value of an outgoing edge of the respective vertex.

14. The non-transitory computer readable storage medium of claim 9, wherein the message is sent to a vertex connected to the respective vertex by an outgoing edge of the directed graph.

15. The non-transitory computer readable storage medium of claim 10, wherein the classification value for the update message indicates that the update message is a global update message, the update message further indicating a reference vertex, and the distance indicated in the update message measures a distance between the respective vertex and the source vertex relative to the respective vertex's distance to the reference vertex.

16. The non-transitory computer readable storage medium of claim 15, wherein the updated value pair associated with the respective vertex corresponds to the source vertex and wherein a distance value for the updated value pair is updated based on the distance indicated in the update message and a distance value of a value pair associated with the respective vertex corresponding to the reference vertex.

17. A system comprising:
   a processor;
   a non-transitory computer readable storage medium storing processor-executable computer program instructions, the instructions comprising instructions for:
   maintaining data in a distributed computing system, the data describing a directed graph representing relationships among items, having a plurality of vertices representing the items, having edges with values representing distances between the items;
   designating a portion of the plurality of vertices as one or more reference vertices;
      executing a multiple reference point algorithm for the plurality of the vertices in the directed graph in parallel for a series of synchronized iterations to determine shortest distances between the plurality of vertices and a source vertex, wherein operations of the multiple reference point algorithm for a respective vertex of the plurality of vertices during an iteration include:
         receiving an update message indicating a distance between the respective vertex and a designated vertex of a set of designated vertices, wherein the set of designated vertices comprises the source vertex and the reference vertices;
         updating a value pair associated with the respective vertex and indicating a distance from the respective vertex to the designated vertex, the updating occurring based on a comparison of the distance indicated in the update message and the distance indicated by the value pair associated with the respective vertex;

determining a new value pair based on the updated value pair; and sending a message including the new value pair to one or more other vertices in the directed graph, wherein the message is a global update message sent directly to all vertices in the plurality of vertices if the respective vertex is one of the one or more reference vertices and the updated value pair indicates a distance from the respective vertex to the source vertex;

aggregating value pairs associated with the plurality of vertices of the directed graph, the aggregated value pairs indicating shortest distances from the plurality of vertices to the source vertex; and outputting the aggregated value pairs.

18. The system of claim 17, wherein the received update message further comprises a classification value indicating whether the update message is a local update message or a global update message.

\* \* \* \* \*